United States Patent [19]
Hoad

[11] 3,841,060

[45] Oct. 15, 1974

[54] GAS WASHER APPARATUS

[75] Inventor: John G. Hoad, Dearborn, Mich.

[73] Assignee: Hoad Engineers, Incorporated, Ypsilanti, Mich.

[22] Filed: Apr. 27, 1973

[21] Appl. No.: 354,952

[52] U.S. Cl.................... 55/220, 55/431, 55/435, 261/117
[51] Int. Cl............................................ B01d 47/00
[58] Field of Search ............ 55/223, 228, 220, 435, 55/302, 428, 430, 431, 118, 119, 240–242; 302/59, 52; 134/166 R, 199; 261/117, 118

[56] References Cited
UNITED STATES PATENTS

| | | | |
|---|---|---|---|
| 2,228,970 | 1/1941 | Owens | 261/117 |
| 3,121,127 | 2/1964 | Hedin | 261/117 |
| 3,537,239 | 11/1970 | Dunmire | 55/242 |
| 3,577,709 | 5/1971 | Hoad | 55/228 |

FOREIGN PATENTS OR APPLICATIONS

| | | | |
|---|---|---|---|
| 1,152,058 | 7/1963 | Germany | 302/52 |
| 508,263 | 1/1952 | Belgium | 55/435 |
| 518,375 | 3/1953 | Belgium | 55/435 |
| 1,176,572 | 8/1964 | Germany | 302/52 |
| 1,009,627 | 11/1965 | England | 302/52 |

Primary Examiner—Frank W. Lutter
Assistant Examiner—David L. Lacey
Attorney, Agent, or Firm—Olsen and Stephenson

[57] ABSTRACT

A wet scrubber for removing dust and other particulate matter from exhaust gases associated with various metalurgical and chemical processes. The scrubber includes an inflatable porous flexible liner and a liquid spray means for directing jets of liquid onto the liner to aid in removal of accumulated matter from the liner.

2 Claims, 2 Drawing Figures

3,841,060

GAS WASHER APPARATUS

BACKGROUND OF THE INVENTION.

The present invention relates to apparatus for the removal of dust and other particulate matter from exhaust gases associated with various metalurgical and chemical processes. The sources of the gases may be rotary kilns as used in the cement, lime, expanded aggregate and similar processes, or such sources may be a cupola, blast furnace, or similar apparatus which discharges exhaust gases carrying particulate matter.

Improvements in apparatus of this character have been made, such as are disclosed in the U.S. Pat. No. 3,577,709, patented May 4, 1971 in the name of John G. Hoad. This patent discloses a spray tower comprising a steel shell which is lined with an elastic material, such as rubber or a suitable elastomer which can be distorted periodically by air inflation between the steel shell and the elastic lining in order to break off any accumulation or accretion of dust building on the lining. The invention disclosed in Pat. No. 3,577,709 is very effective, but instances arise where more rapid and positive removal of the accumulation or accretion are desired.

SUMMARY OF THE INVENTION.

The present invention is an improvement over the apparatus disclosed in the aforesaid U.S. Pat. No. 3,577,709, and provides a more positive and more effective arrangement for removal of accumulation or accretion of dust buildup on the lining of the scrubber.

According to one form of the present invention, scrubber apparatus is provided for recovering or removing entrained particulate matter from gases comprising a settling basin, a wet scrubber mounted over the settling basin, the scrubber having a tower free of a bottom wall so as to be completely open at the bottom to said settling basin and open at the top to exhaust and open adjacent to its bottom to a source of said gases. Liquid spray means are mounted in the tower for spraying liquid countercurrent into contact with the gases rising in the tower to remove the particulate matter therefrom by gravity directly to the settling basin. The tower has an outer shell and an elastic liner. Means are provided for introducing a pressurized medium between the liner and the shell to distort the liner to loosen accumulated matter therefrom for discharge by gravity directly to the basin. The elastic liner is porous to permit discharge of at least some of the pressurized medium through the liner to aid in removal of the accumulated matter from the liner. The liquid spray means also includes a plurality of circular conduits located adjacent to the inner surface of the liner, the conduits containing apertures for discharging spray liquid into the gases and also tangentially along the surface of the liner to aid in removal of the accumulated matter from the liner. Additional means are also provided for evacuating the pressurized medium remaining between the shell and the liner so that it is not necessary to wait until all of the pressurized medium has passed through the apertures in the liner to allow the liner to contract to its normal position.

Thus, it is one of the objects of the present invention to provide an improved gas scrubbing apparatus which can be used in a most effective manner for the removal or recovery of entrained particulate matter from gases.

Other objects of this invention will appear in the following description and appended claims, reference being had to the accompanying drawings forming a part of this specification wherein like reference characters designate corresponding parts in the several views.

Figures 1, 2:
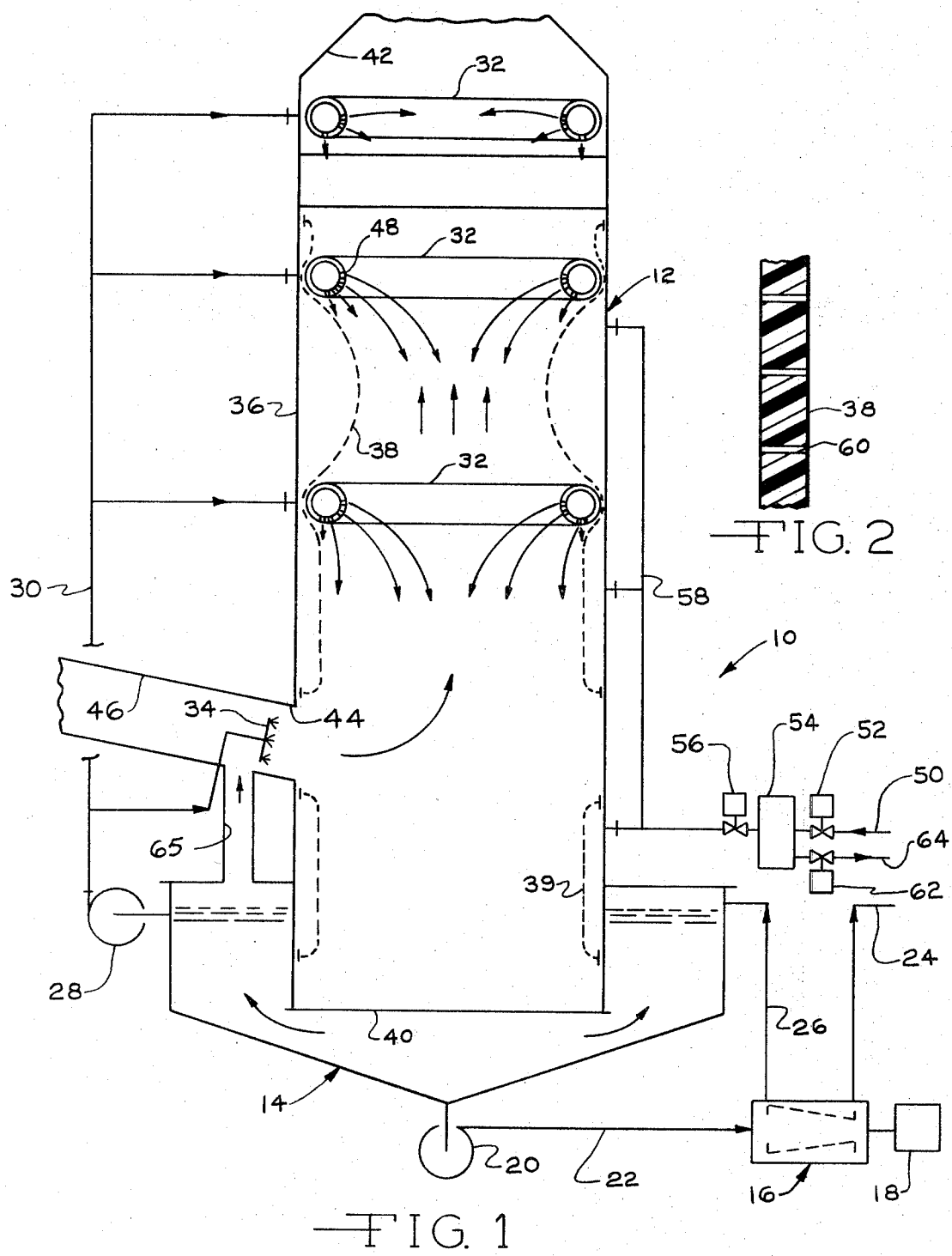
FIG. 1 illustrates schematically a combined wet scrubber and settling basin embodying the present invention.
FIG. 2 is an enlarged fragmentary section of the inflatable liner.

DESCRIPTION OF THE PREFERRED EMBODIMENT.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawing, the invention will be described in greater detail. As there shown, a combined wet scrubber and settling basin 10 is provided having a scrubber tower 12 positioned vertically over a settling basin 14. For the purposes of description, the term "settling basin" should be understood to include any type of settling tank, clarifier tank or leaching tank, or the like, which may or may not have a rake mechanism and drive therefor, and which has been constructed so as to permit the installation of the scrubber tower 12 directly over the feed area of the settling basin 14.

A centrifugal separator 16 which includes the electric motor 18 is in communication with the settling basin 14 via the underflow pump 20 and conduit 22 so that the contents within the settling basin 14 can be pumped to the centrifugal separator 16 from which solid particles can be discharged at 24 and the separated liquid can be returned via conduit 26 to the settling basin 14. The effluent from the settling basin 14 can be removed by the spray pump 28 for discharge via the conduit basin 30 to the spray heads 32 and 34.

The scrubber tower 12 has an outer shell or casing 36 and inner elastic liners 38 and 39 made of rubber or other suitable elastic materials. The tower 12 is open at the bottom at 40 and is open at the top 42 to exhaust. A suitable exhaust blower or fan (not shown) may be mounted in the upper end of the tower 12 for exhausting gases from the tower. The tower 12 also has an opening 44 which is in communication with the passageway 46 leading from apparatus associated with chemical or metalurgical processes such as rotary kilns of a cement plant, or the like.

From the preceding description, it will be understood that exhaust gases associated with the chemical or metalurgical processes can be discharged into the tower 12 through the opening 44 adjacent to the bottom thereof, and such gases will flow upwardly through the unobstructed passageway provided in the interior of the tower 12 and will be exhausted at the outlet 42.

Normally, the exhaust gases which enter the tower 12 through the opening 44 will contain a substantial amount of particulate matter associated with the process from which they originate. The particulate matter is removed from the dust-laden gases by liquid spray which is introduced into the tower 12 countercurrent to the flow of these gases. The liquid spray is introduced to the interior of the tower by means of the plurality of spray heads 32 which are circular conduits located adjacent to the inner surface of the liner 38. The conduits contain a plurality of radially outwardly directed apertures 48 for directing the spray in a desired flow pattern countercurrent to the flow of the gases through the scrubber tower 12. Some of these apertures are directed so that they will cause a flow of the spray liquid tangentially along the surface of the liner 38. By virtue of this nozzle arrangement the spray liquid will aid in removal of the accumulations on the inner surface of the liner 38.

As previously indicated, the scrubber tower 12 is lined with elastic material which forms the liner 38, and the latter is periodically inflated or distorted by air pressure or other suitable medium which can be introduced under pressure at 50. The pressurized air can flow through the motor-controlled valve 52, pressure tank 54, motor-controlled valve 56 and conduits 58 to regions between the liners 38 and 39 for inflating the liners. As shown in FIG. 2, the liners are porous and have small apertures 60 extending therethrough so that the pressurized medium can pass through in limited quantities as air jets to aid in removing the accumulated matter from the liners 38 and 39. Thus, in the present invention the accumulated matter is removed from the liner in part by action of the pressurized medium distorting or inflating the liner, in part as the result of the pressurized medium passing through the porous liner 38, and still further as a result of the jets of liquid that are caused to travel tangentially along the surface of the liner.

Suitable control means are provided which are not shown for introducing the pressurized medium between the shell 36 and the liner 38 and also for evacuating the zone between the shell 36 and the liner 38. For evacuation purposes a motorized valve 62 is provided which is in communication with a vacuum pump, not shown, via the conduit 64.

In the disclosed embodiment a passageway 65 is provided from the settling basin 14 through which gases, such as carbon dioxide can be discharged into the passageway 46 for flow through the scrubber tower 12. The spray header 34 may be provided to cool and to initiate the removal of the dust particles from the gases flowing through the passageway 46 for discharge directly into the settling basin 14.

The height and diameter of the tower 12, the configuration, number and design of the spray heads 32 and 34, the quality of the spray water and similar details will vary, depending upon the requirements of the particular system. Various factors such as the gas flow, gas temperature, dust load, particle size and distribution, desired collection efficiency and similar considerations will be determinative of the specific design that will be utilized. In all instances, the temperature of the exhaust gases must be considered and sufficient effluent or water must be sprayed onto the gases adjacent to the opening 44 to prevent heat damage to linings 38 and 39.

From the foregoing description it will be recognized that a very efficient and relatively simple combined scrubber tower and settling basin is provided. The linings 38 and 39, because of their inflatable character will insure that the interior of the tower will remain substantially clean at all times, and the lining will prevent corrosive action from occurring to the steel shell or casing or to other components of the scrubber tower. The unique arrangement whereby the lining is inflated, the pressurized medium is permitted to leak through the liner to aid in removing the particles and the arrangement whereby jets of spray liquid are directed tangentially along the surface of the liner all contribute to provide rapid and effective removal of the accumulated matter.

It is claimed:

1. Apparatus for recovering or removing entrained particulate matter from gases comprising a settling basin, and a wet scrubber mounted over said settling basin, said scrubber having a tower free of a bottom wall so as to be completely open at the bottom to said settling basin, open at the top to exhaust and open adjacent to its bottom to a source of said gases, liquid spray means mounted in said tower for spraying liquid counter-current into contact with gases rising in said tower to remove the particulate matter therefrom by gravity directly to said settling basin, said tower having an outer shell and an elastic liner, means for introducing a pressurizing medium between said liner and said shell to distort said liner to loosen accumulated matter therefrom for discharge by gravity directly to said basin, said elastic liner being porus to permit discharge of the pressurized medium through said liner to aid in removal of the accumulated matter from the liner, said liquid spray means including a plurality of circular conduits located adjacent to the inner surface of said liner, said conduits containing apertures for discharging spray liquid into said gases and to deliver liquid essentially tangentially against the inner surface of said liner to aid in removal of the accumulated matter from the liner.

2. Apparatus that is defined in claim 1, including additional means for evacuating said pressured medium from between said shell and said liner.

\* \* \* \* \*